US008004137B2

(12) United States Patent
Studer

(10) Patent No.: US 8,004,137 B2
(45) Date of Patent: Aug. 23, 2011

(54) ELECTROMECHANICAL TRANSFORMER

(75) Inventor: Philip Albert Studer, Silver Spring, MD (US)

(73) Assignees: Philip Albert Studer, Silver Spring, MD (US); Sandor Wayne Shapery, San Diego, CA (US)

( * ) Notice: Subject to any disclaimer, the term of this patent is extended or adjusted under 35 U.S.C. 154(b) by 880 days.

(21) Appl. No.: 11/510,818

(22) Filed: Aug. 28, 2006

(65) Prior Publication Data

US 2007/0046116 A1    Mar. 1, 2007

Related U.S. Application Data

(60) Provisional application No. 60/711,874, filed on Aug. 29, 2005.

(51) Int. Cl.
*H02K 41/03* (2006.01)
(52) U.S. Cl. .......................................... 310/90.5; 310/83
(58) Field of Classification Search .................... 310/20, 310/83, 90.5; 74/89.23, 424.71; 335/285, 335/306
See application file for complete search history.

(56) References Cited

U.S. PATENT DOCUMENTS

| | | | | |
|---|---|---|---|---|
| 3,814,962 | A * | 6/1974 | Baermann | 310/103 |
| 3,824,420 | A * | 7/1974 | Stegeman et al. | 310/80 |
| 3,865,442 | A * | 2/1975 | Studer | 310/90.5 |
| 4,000,929 | A * | 1/1977 | Studer | 310/90.5 |
| 4,006,862 | A | 2/1977 | Shively et al. | |
| 4,145,625 | A * | 3/1979 | Seilly | 310/27 |
| 4,591,313 | A * | 5/1986 | Miyatake et al. | 416/155 |
| 4,658,163 | A * | 4/1987 | Inoue | 310/80 |
| 5,214,972 | A * | 6/1993 | Larson et al. | 74/89.26 |
| 6,741,000 | B2 * | 5/2004 | Newcomb | 310/87 |
| 7,176,590 | B2 * | 2/2007 | Fujimoto | 310/12.15 |
| 7,374,013 | B2 * | 5/2008 | Mizuhara et al. | 180/444 |
| 7,520,192 | B2 * | 4/2009 | Mock | 74/89.34 |
| 7,617,779 | B2 | 11/2009 | Studer | |
| 2004/0027020 | A1 * | 2/2004 | Newcomb | 310/156.01 |

FOREIGN PATENT DOCUMENTS

EP       1560320 A1 *  8/2005
WO   WO 2004042902 A1 *  5/2004

OTHER PUBLICATIONS

Studer, "Magnetic Bearings for Spacecraft," NAGA/GSFC X 721-72-56, (Jan. 1972) (pp. 1-6, total in 9 pages).

* cited by examiner

*Primary Examiner* — Quyen Leung
*Assistant Examiner* — David W. Scheuermann
(74) *Attorney, Agent, or Firm* — Knobbe Martens Olson & Bear LLP

(57) ABSTRACT

A system and method for moving an object is disclosed. In one aspect, there is a device for moving an object. The device comprises a penetrating structure comprising an externally threaded surface. The device further comprises a receiving structure comprising an internally threaded cylinder surrounding the penetrating structure. The device further comprises a source of magnetic flux configured to magnetize the externally threaded surface with a first polarity and to magnetize the internally threaded cylinder with a second polarity that is different from the first polarity. The device further comprises a conductor positioned between the penetrating structure and the receiving structure configured to conduct an electric current. The device further comprises a sensor configured to determine the radial position of the penetrating structure with respect to the receiving structure. The device further comprises a controller configured to control the electric current in the conductor based on the determined radial position.

20 Claims, 3 Drawing Sheets

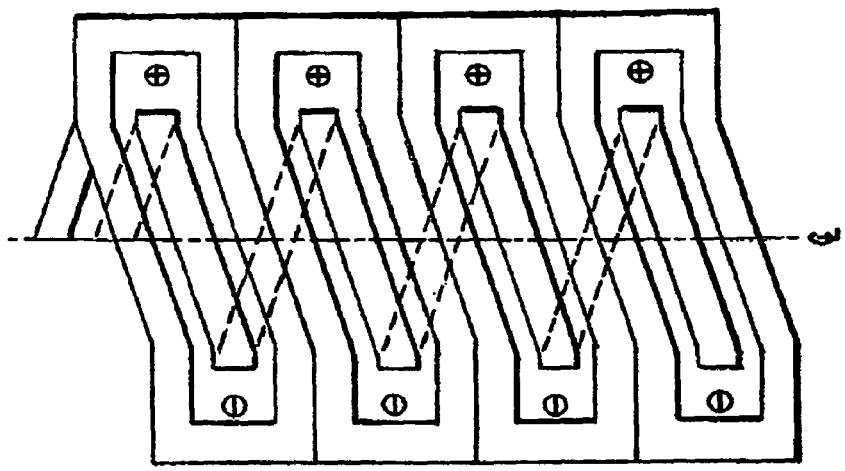
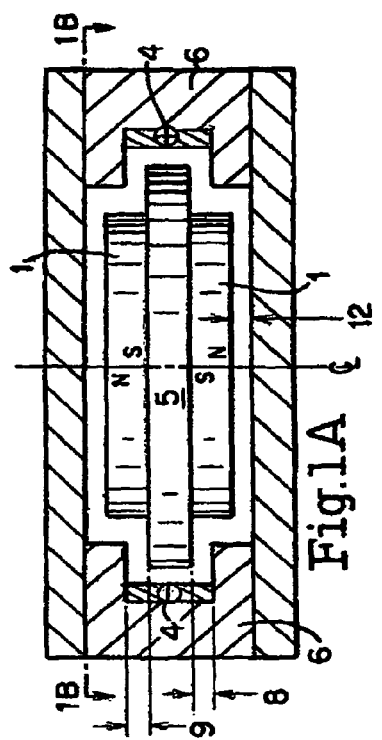
Fig.1A
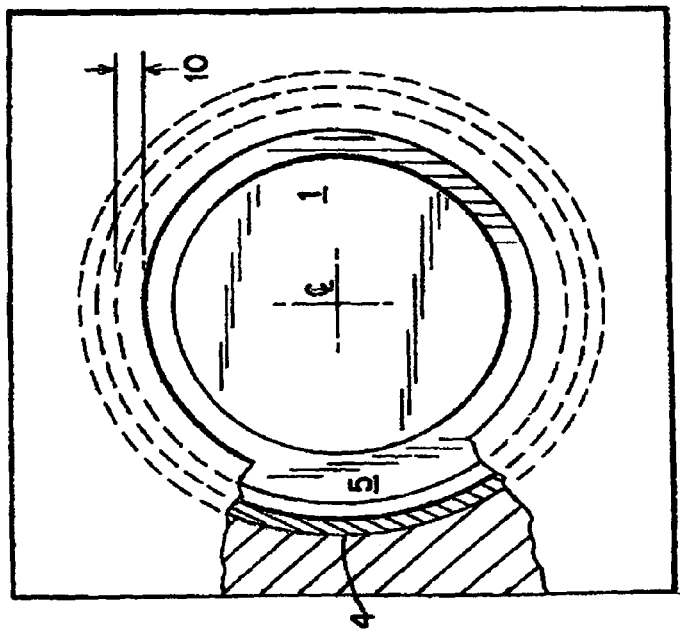
Fig.1B
Fig.2

ELECTROMECHANICAL TRANSFORMER

CROSS-REFERENCE TO RELATED APPLICATIONS

This application claims the benefit under 35 U.S.C. §119(e) of U.S. Provisional Application No. 60/711,874, filed Aug. 29, 2005, which is hereby incorporated by reference in its entirety.

BACKGROUND

1. Field

This disclosure generally relates to systems and methods for moving an object.

2. Description of Related Art

The inclined plane is one of the simplest fundamental mechanical devices, its use was employed in the construction of the pyramids. The advent of machine tools saw the introduction of screw threads and screw jacks with which a single man can lift a building. High precision worm gears exhibit tremendous mechanical advantage in a single pass. All of these had obvious limitations due to friction. The performance and speed of operation took a big step forward in recent years with the introduction of ball screws with recycling balls which greatly reduced sliding contact.

In the 1960's magnetic bearings were invented and developed (See Magnetic Bearings for Spacecraft, NASA/GSFC X 721-72-56 P.A. Studer, January 1972), providing not only near frictionless support but eliminating the need for lubrication which allows such systems to be employed in clean rooms, medical facilities, and food processing plants. The lack of physical contact can eliminate wear and allow lifetimes independent of speed.

SUMMARY

The system, method, and devices of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description" one will understand how the features of this invention provide advantages such as a device for moving an object with reduced friction.

In one aspect, a device for moving an object is provided. The device comprises a penetrating structure comprising an externally threaded surface. The device further comprises a receiving structure comprising an internally threaded cylinder surrounding the penetrating structure. The device further comprises a source of magnetic flux configured to magnetize the externally threaded surface with a first polarity and to magnetize the internally threaded cylinder with a second polarity that is different from the first polarity. The device further comprises a conductor positioned between the penetrating structure and the receiving structure configured to conduct an electric current. The device further comprises a sensor configured to determine the radial position of the penetrating structure with respect to the receiving structure. The device further comprises a controller configured to control the electric current in the conductor based on the determined radial position.

In another aspect, a device for moving an object is provided. The device comprises a penetrating structure comprising an externally threaded surface. The device further comprises a receiving structure comprising an internally threaded cylinder surrounding the penetrating structure. The device further comprises a source of magnetic flux configured to magnetize the externally threaded surface with a first polarity and to magnetize the internally threaded cylinder with a second polarity that is different from the first polarity. The device further comprises a conductor positioned between the penetrating structure and the receiving structure configured to conduct an electric current. The source of magnetic flux comprises at least one of a rare-earth magnet and a molded magnet.

In another aspect, a device for moving an object is provided. The device comprises a penetrating structure comprising an externally threaded surface. The device further comprises a receiving structure comprising an internally threaded cylinder surrounding the penetrating structure. The device further comprises a source of magnetic flux configured to magnetize the externally threaded surface with a first polarity and to magnetize the internally threaded cylinder with a second polarity that is different from the first polarity. The device further comprises a conductor positioned between the penetrating structure and the receiving structure configured to conduct an electric current. The source of magnetic flux comprises a permanent magnet. The permanent magnet comprises a cylinder having an upper portion of the first polarity and a lower portion of the second polarity.

In another aspect, a method of manufacturing a device for moving an object is provided. The method comprises providing a penetrating structure comprising an externally threaded surface. The method further comprises positioning a receiving structure comprising an internally threaded cylinder surrounding a penetrating structure. The externally threaded surface is magnetized with a first polarity and the internally threaded cylinder is magnetized with a second polarity that is different from the first polarity. The method further comprises positioning a conductor between the penetrating structure and the receiving structure. The method further comprises coupling a controller to the conductor and providing a sensor configured to determine the radial position of the penetrating structure with respect to the receiving structure. The controller is configured to control electric current in the conductor based on the determined radial position.

In another aspect, a device for moving an object is provided. The device comprises means for rotating around a central axis. The device further comprises means for converting rotary motion of the means for rotating into linear motion. At least a portion of the means for rotating is magnetized with a first polarity and at least a portion of the means for converting is magnetized with a second polarity that is different from the first polarity. The device further comprises means for conducting an electric current positioned between the means for rotating and the means for converting. The device further comprises means for determining the radial position of the means for rotating with respect to the means for converting. The device further comprises means for controlling the electric current in the means for conducting based on the determined radial position.

BRIEF DESCRIPTION OF THE DRAWINGS

FIG. 1A is a cross-sectional view of an assembly with a slot.

FIG. 1B is a top view of the assembly of FIG. 1A.

FIG. 2 is a cross-sectional view of a helical structure.

DETAILED DESCRIPTION

Figure 3A:
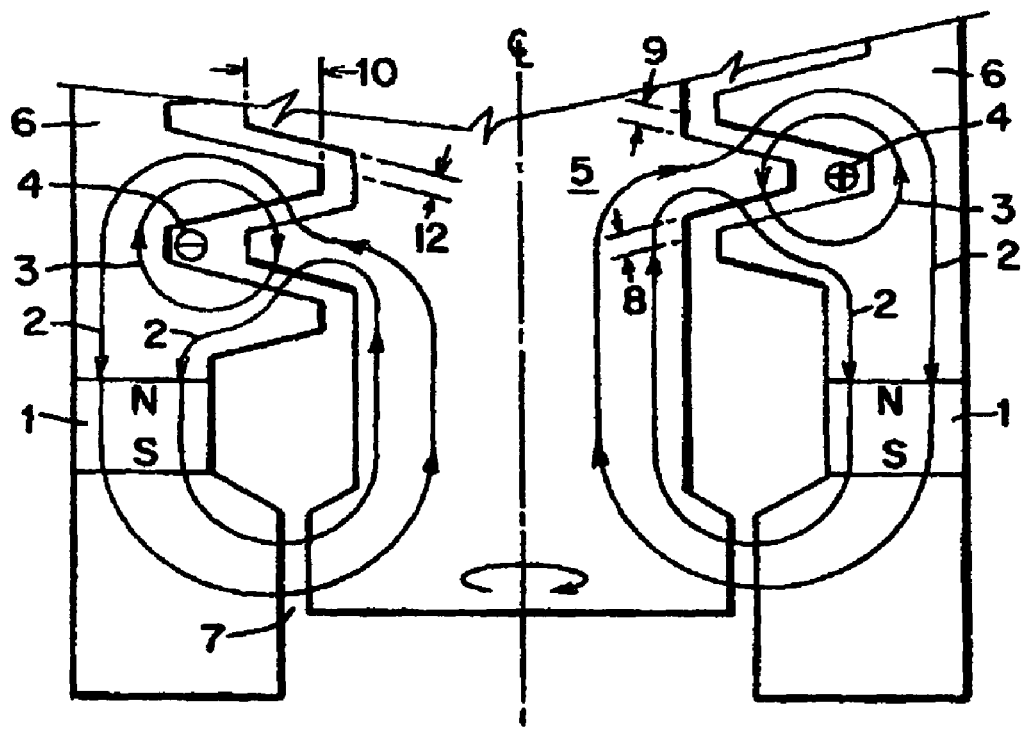
FIGS. 3A and 3B are cross-sectional of engaged helices.

For inclined planes and screw-type actuators, the orders of magnitude lower friction opens a whole new range of applications and dramatically improves efficiency. Friction in screw jacks is so large that it is depended on to prevent large loads from back driving. Active electromagnetic forces can be switched on or off at will.

I have called this device an electromechanical transformer since it is a bidirectional device, allowing input torques (or forces) to produce multiplied output forces (or torques) with corresponding displacement reduction; the product remaining constant just as the volt current ratio of an electrical transformer behaves, and at equally high efficiency.

The Background has given some historical perspective on the evolutionary development of former devices of this type and stated that a development in electro-magnetics has changed a fundamental limitation on their design and performance. How magnetic bearing technology can be implemented to effect this result is the subject of this disclosure.

Magnetic bearings have been designed to control many axes, most commonly radial and axial. It has been found that they are most effective when permanent magnet (bias) flux is introduced into the region to be controlled, as in these illustrations.

If permanent magnets cause each of the two parts to be of opposite polarity, magnetic flux will flow between the two, largely where they are closest. If a gear tooth, for instance, of a magnetically polarized worm gear passes between two teeth of another gear, flux will be passing to the right and to the left, equally if it is centered. If a sensor providing a signal proportional to a gap be fed to an amplifier supplying current to conductors below the central tooth, it can increase the flux on one side and lessen the other. Forces proportional to the sq. of the flux density can be produced to keep the tooth centered against external forces. These forces are also proportional to the area over which the flux acts and the net force of these oppositely directed forces acts to move or hold the tooth centered and free of contact even when carrying rated loads.

Mechanically, the behavior of these devices is exactly as expected, determined by well known rules of mechanics, over a greater range of operation than was formerly possible due to frictional limitations.

The basis for this device is the inclined plane in which a heavy object can be moved vertically by a relatively smaller force exerted laterally over a greater distance, as was known since ancient times.

A more compact version of this device is the common screw thread in which the inclined plane is made circular, forming a helix such as is in bolts, nuts, or worm gears. Thus a rotary to linear motion device is created.

The limitations of these devices are the result of friction which has been alleviated by lubricants and more recently by ball bearings. Reduction of friction also allows bidirectional operation of these devices, allowing linear to rotary and rotary to linear motions.

This disclosure describes and illustrates a new means for further improving their operation such that still less energy is dissipated and long lifetimes, even in fast repetitive actions is obtained, by incorporating new electromagnetic control methods, known as magnetic bearing technology. By these means, the working surfaces are kept separated by magnetic forces and non-contacting operation allows virtually friction-free movement with no wear debris and with immunity to the operating environment.

The device consists of two elements of opposite magnetic polarity, engaged as a screw and nut, with one thread typically in a slot or recess of the other, such that magnetic flux flows through each gap in opposite directions leading to balanced forces when the surfaces are equidistant and the flux density the same in both directions. This position is inherently unstable, therefore a control magnetic flux is made to pass unidirectionally through both gaps where it will generate a force by increasing the flux in one gap and decreasing it in the other. Reversing the direction of the current providing this control flux reverses the direction of the force which is proportional to the magnitude of the control current. By the use of a position sensor and well known servo techniques the position of the two oppositely magnetized surfaces can be centered with equal gaps while allowing free motion perpendicular to the gap.

The circular (helical) form not only results in a compact device but also allows the slightly off axis direction of the inclined surfaces and forces to be cancelled out to a true axial force and the lateral forces to result in a torque about the central axis. It also allows the current carrying conductors about which the control flux circulates to start and terminate at nearly the same point for greatest effectiveness.

Various means may be employed to confine the motions to the desired paths, ranging from simple close fitting concentric surfaces with conventional lubricants to magnetic bearing techniques to preserve the non-contacting advantages of the previously described device. The helical surfaces may be raised with respect to their surroundings, forming smaller mating circular gaps which can passively magnetically constrain radial movement to maintain concentricity while allowing free motion along the helical path. Thus the constant magnetic flux can both define the direction of motion, when at least one degree of freedom is actively controlled and serve as a bias flux to intensify the force generated by the control flux. This can result in a totally non-contacting electromechanical device capable of efficient non-contacting linear/rotary motion conversion with a fixed ratio determined by the slope of the helix, with a force/displacement characteristic of an electrical transformer with similar ability to effect high input/output ratios with little loss. An additional element may be added to increase the functionality of the device, that being non metallic coatings or covers over the active surfaces to prevent metal to metal contact of the magnetic surfaces. The purpose of these additions is to prevent metal to metal contact of the magnetic surfaces even in the power off condition, reducing the mechanical clearance to less than the magnetic gap to ease initial starting, and offer ordinary action unpowered. The ability of the device to provide two states of operation by merely switching the servo power on or off adds to its versatility.

There are three essential elements to a typical bidirectional magnetic thrust bearing. FIG. 1A shows a cross-section of an outer assembly with a slot, enclosing a center element larger than the openings above and below it, such that circumferential mating surfaces exist. Magnetic flux from the permanent magnets on either side of the central element passes between these mating surfaces. A coil of conductors surrounding the inner element carries control currents which change the ratio of flux densities above and below the central element so that large differential axial forces are generated proportional to the magnitude and direction of the control current times the fixed P.M. flux. These forces are the difference between the bias flux density plus the control flux density squared versus the bias flux density minus the control flux density squared times the effective area. The squared term in the equation makes the bias flux, derived passively from the permanent magnet, important in efficient control effectiveness especially since greater ampere-turns slow the response. The circular symmetry of these parts is shown in FIG. 1B. All parts except the coil and permanent magnets are high permeability steel. Flux flows between all parts with differing magnetic potential with higher intensity in small gaps.

Thus a relatively simple construction of solid steel parts, a constant source of magnetic bias flux, and a coil carrying a bidirectional proportional current assumed to be controlled and compensated by known servo techniques based on sensed position, flux density, or other suitable information represents a magnetic bearing technique which can be applied to a variety of inclined plane structures. These include simple linear motion wedges, worm gear to gear or to a rack, and a whole class of mechanical devices based on the inclined plane most commonly found using screw threads either concentric or offset.

Figure 3B:
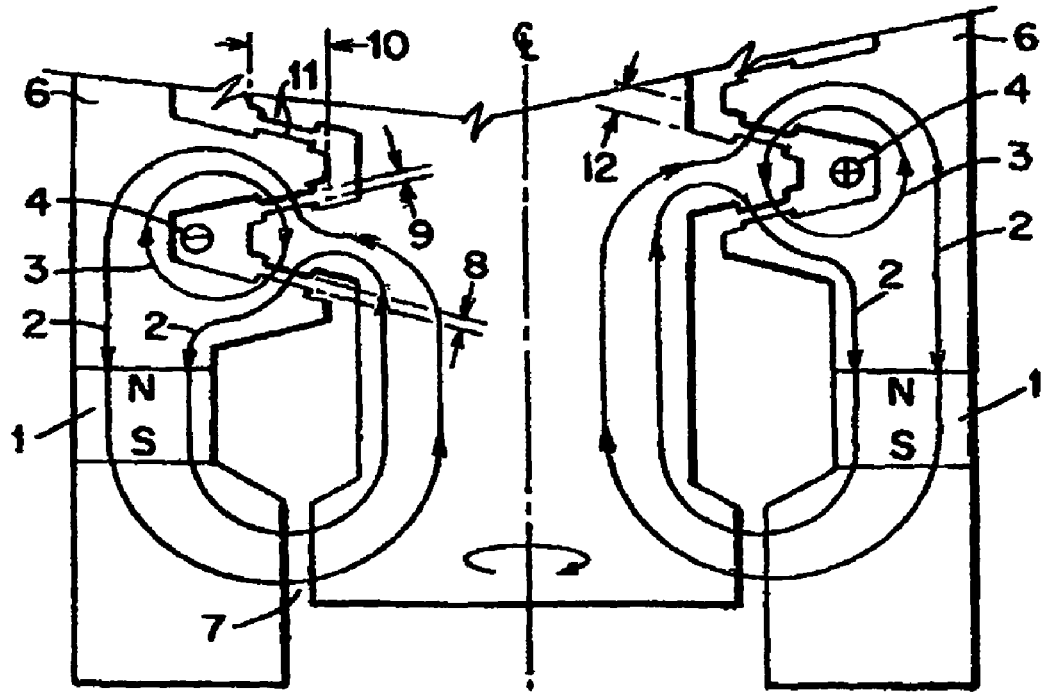
Figure 4:
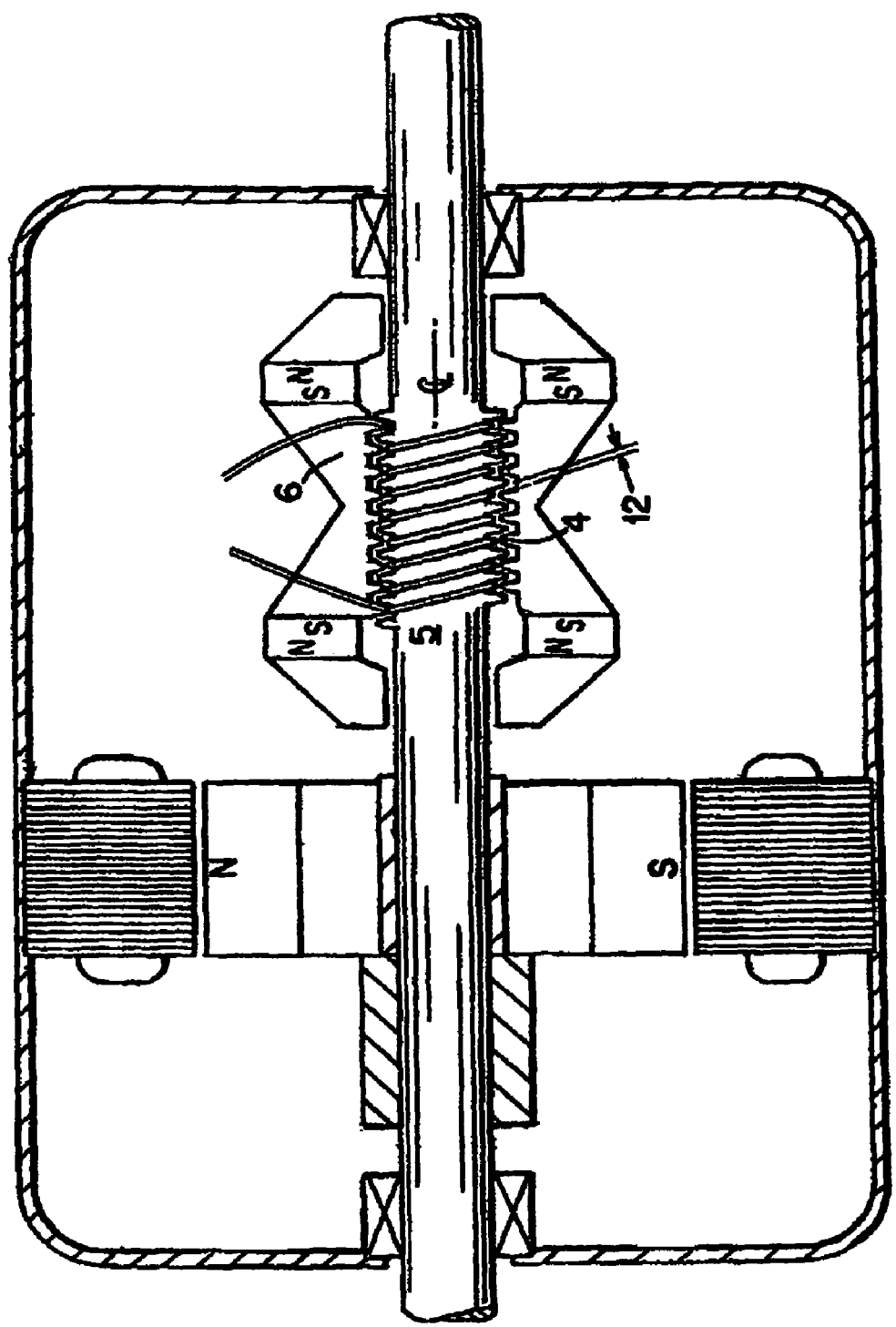
FIG. 4 is a partial cutaway view of an electromechanical transformer.

A reason for this detailed description of the magnetic bearing is that a conceptually simple application of this technique to these structures results in useful forms of the electromagnetic transformer disclosed in this document. If the identical planar design just described were cut radially at one location and the parts to one side raised gradually in the axial direction, it would form a helix. This structure may now continue as many turns as desired with every turn increasing the load capacity within a given diameter, as shown in cross-section in FIG. 2. FIG. 3 shows a section of the assembled construction of two engaged helices of permeable material from which magnetic flux from a constant bias source (1.) passes between. The flux divides into both axial directions to mating teeth on (5.) after which it rejoins and returns via the continuous gap (7.) Control flux (3.) due to currents in conductors (4.) wound in the same helical path inside their engaged regions, flow unidirectionally across two axial gaps. The control flux, (shown separately for clarity) all teeth carrying nominally the same total flux, increases flux density in one direction and decreases it in the other gap. This differential flux density produces the desired axial force, as a function of the magnitude and direction of the control current, itself a function of the axial error signal. This control is exercised to maintain gaps (8.) and (9.) to be equal, eliminating all axial contact and, with radial bearings, not shown, maintaining concentricity (10.), held constant, assures both zero contact and no backlash within the limits of the controller. This conceptually defines a bilateral linear to rotary converter which would likely find many applications seeking performance improvements as friction, backlash, and environmental limitations are removed. The source of bias flux may be configured many ways to assure magnetic flux passing between the two sets of teeth. Radially magnetized cylinders are available; molded shapes of high energy rare-earth magnets are also now available.

The mating surfaces may be formed by many methods or simply machined by ordinary thread making equipment capable of forming both internal and external threads. The mating surfaces may be covered or coated with a non-magnetic material to prevent metal to metal contact and allow power off manual operability.

The preceding device described a coaxial design but an offset design is also possible which allows change of rotational axis where an application requires it. An output device might be of any diameter including a rack for direct linear output not along the same axis as the input.

The selection of most configurations is heavily application dependent but one of the most frequent actuator styles is a concentric rotary to linear converter such a device will be described illustrating the salient features of an electro-mechanical transformer. This device employs a torquer (hollow bore) motor rotating an internally threaded cylinder. The stator of this motor is fastened to the structure. This outer cylinder has its internally threaded teeth engaged to similar pitch teeth on the outer surface of the central shaft. A ring shaped magnet, at each end of the outer cylinder with like polarity facing the cylinder causes magnetic flux to flow in each direction to its neighboring teeth on the central shaft. This is the bias flux; with no control currents, these outer teeth pull forcibly one way or the other, the central position being highly unstable. A control coil is situated to pass magnetic flux adding to the bias flux on one side of each outer tooth and subtracting from the bias flux on the other. This generates an axial force proportional to the square of the difference in flux density and reverses direction as the current is reversed. By classical servo techniques, the inner and outer helical teeth can be controlled to stay equally separated. This allows the rotation of the outer cylinder to force axial motion of the inner shaft, if it be constrained from rotating, which constraint nay be at the load or other location. The motions are virtually devoid of friction, cause no wear or wear products, and the control reduces backlash to any desired level.

This constitutes the mechanical action where the torque of the motor is the result of forces at the airgap radius which move a distance equal to the rotor circumference while the output moves only one tooth pitch. Since the force-distance product remains constant, the "mechanical advantage" can be calculated and found to be very large. A similar device (without the thrust bearing) would allow forced axial motion of the inner shaft to cause rotation of the outer helix and attached motor/generator rotor.

Magnetic bearings have always (to my knowledge) been designed to have significant gaps, in this use of that technology in the manner described, the technology can be applied to systems which have essentially no mechanical clearance (with magnetic gap allowed), most of the desired objectives can be obtained by controlling the contact force to approach zero, bringing the friction force with it. The magnetic surfaces can be coated or covered with non-magnetic material allowing the mechanical gap to be smaller than the magnetic gap.

This disclosure describes an ancient mechanical device which has been improved by modern machine tools, lubricants, ball bearings, and now by electromagnetics. A gear reducer/increaser with the use of magnetic bearing technology changes a friction dominated device into an element that can operate efficiently indefinitely in any environment with a range of operation heretofore impossible. Backlash, an inherent weakness of prior precision geared systems is small and controllable.

This device can convert linear or rotational motions at specific force or torque levels to larger or smaller displacements with reciprocal changes in force or torque to preserve conservation of energy. It can be constructed in a variety of forms, with circular and concentric form gaining advantages of symmetry mechanically, less stray magnetic flux, and better "copper" utilization electrically.

A design of general utility showing a device of this type is illustrated and described not to limit variations for needs, materials, or methods of manufacture but to illustrate the parts and their function.

In one embodiment, there is provided a device comprising two wedge-like mating surfaces electronically controlled to maintain their separation constant by means of electromagnetic forces, allowing free motion along this diagonal path.

In another embodiment, there is provided a spiral form of thread-like mating surfaces with controlled electromagnetic forces holding the separation distance constant while allowing free motion along this prescribed path.

In another embodiment, there is provided a device which, by means of electromagnetic forces, maintains the working surfaces of tooth-like elements to be equally spaced, reducing or eliminating backlash or position error in reversing or oscillating systems.

In another embodiment, there is provided a device which is made part of an actuator to produce controllable axial forces or motion by rotary means.

In another embodiment, there is provided a device to convert axial force or motion to rotational motion.

In another embodiment, there is provided a device to be used for displacement or force multiplication.

In another embodiment, there is provided a device to be used for axial to rotary motion conversion, or force to torque conversion.

In another embodiment, there is provided a device to be used for rotational to axis motion or force conversion.

In another embodiment, there is a device to be used to enhance the effective area and force capability of a given diameter magnetic bearing or electro-mechanical transformer.

In another embodiment, there is a device in which the magnetic field bias flux is provided by electromagnet means either in conjunction with control coils or independently.

In another embodiment, there is a device in which a control force is produced by controlled currents interacting with magnetic flux independently or in conjunction with forces related to the square of the flux density.

In another embodiment, there is a device in which there is no separation between controlled sliding parts other than lubricating firms or low friction plastic.

The invention claimed is:

1. A device for moving an object, the device comprising:
   a penetrating structure comprising an externally threaded surface;
   a receiving structure comprising an internally threaded cylinder surrounding the penetrating structure;
   a source of magnetic flux configured to magnetize the externally threaded surface with a first polarity and to magnetize the internally threaded cylinder with a second polarity that is different from the first polarity;
   a conductor positioned between the penetrating structure and the receiving structure configured to conduct an electric current;
   a sensor configured to determine the radial position of the penetrating structure with respect to the receiving structure; and
   a controller configured to control the electric current in the conductor based on the determined radial position.

2. The device of claim 1, wherein the controller is configured to control the electric current at a level sufficient to prevent the penetrating structure from contacting the receiving structure.

3. The device of claim 1, wherein the controller is configured to control the electric current at a level sufficient to maintain the externally threaded cylinder in a position equidistant from a first portion of the internally threaded surface and a second portion of the internally threaded surface.

4. The device of claim 1, further comprising a separator configured to maintain the radial position of the penetrating structure with respect to the receiving structure.

5. The device of claim 4, wherein the penetrating structure is cylindrical and the separator comprises a radial bearing.

6. The device of claim 1, wherein the source of magnetic flux is attached to the receiving structure.

7. A device for moving an object, the device comprising:
   a penetrating structure comprising an externally threaded surface;
   a receiving structure comprising an internally threaded cylinder surrounding the penetrating structure;
   a source of magnetic flux configured to magnetize the externally threaded surface with a first polarity and to magnetize the internally threaded cylinder with a second polarity that is different from the first polarity; and
   a conductor positioned between the penetrating structure and the receiving structure configured to conduct an electric current, wherein the source of magnetic flux comprises at least one of a rare-earth magnet and a molded magnet.

8. A device for moving an object, the device comprising:
   a penetrating structure comprising an externally threaded surface;
   a receiving structure comprising an internally threaded cylinder surrounding the penetrating structure;
   a source of magnetic flux configured to magnetize the externally threaded surface with a first polarity and to magnetize the internally threaded cylinder with a second polarity that is different from the first polarity; and
   a conductor positioned between the penetrating structure and the receiving structure configured to conduct an electric current, wherein the source of magnetic flux comprises a permanent magnet comprising a cylinder having an upper portion of the first polarity and a lower portion of the second polarity.

9. The device of claim 1, further comprising a non-magnetic coating that coats at least one of the externally threaded cylinder and the internally threaded surface.

10. The device of claim 1, wherein at least one of the penetrating structure and the receiving structure comprises a magnetically permeable material.

11. The device of claim 1, wherein the externally threaded cylinder and the internally threaded surface have the same pitch.

12. A method of manufacturing a device for moving an object, the method comprising:
   providing a penetrating structure comprising an externally threaded surface;
   positioning a receiving structure comprising an internally threaded cylinder surrounding a penetrating structure, wherein the externally threaded surface is magnetized with a first polarity and the internally threaded cylinder is magnetized with a second polarity that is different from the first polarity;
   positioning a conductor between the penetrating structure and the receiving structure; and
   coupling a controller to the conductor and providing a sensor configured to determine the radial position of the penetrating structure with respect to the receiving structure, wherein the controller is configured to control electric current in the conductor based on the determined radial position.

13. The method of claim 12, further comprising positioning a separator between the penetrating structure and the receiving structure, wherein the separator is configured to maintain the radial position of the penetrating structure with respect to the receiving structure.

14. The method of claim 13, wherein the penetrating structure is cylindrical and the separator comprises a radial bearing.

15. The method of claim 12, wherein magnetizing comprising attaching a source of magnetic flux to the receiving structure.

16. The method of claim 12, further comprising coating at least one of the externally threaded cylinder and the internally threaded surface with a non-magnetic coating.

17. A device for moving an object, the device comprising:
    means for rotating around a central axis;
    means for converting rotary motion of the means for rotating into linear motion, wherein at least a portion of the means for rotating is magnetized with a first polarity and at least a portion of the means for converting is magnetized with a second polarity that is different from the first polarity;
    means for conducting an electric current positioned between the means for rotating and the means for converting;
    means for determining the radial position of the means for rotating with respect to the means for converting; and
    means for controlling the electric current in the means for conducting based on the determined radial position.

18. The device of claim 17, further comprising means for magnetizing at least a portion of the means for rotating with a first polarity and for magnetizing at least a portion of the mean for converting with a second polarity that is different from the first polarity.

19. The device of claim 18, wherein the means for magnetizing comprising a permanent magnet.

20. The device of claim 17, wherein the means for conducting an electric current comprises a conductor.

\* \* \* \* \*

UNITED STATES PATENT AND TRADEMARK OFFICE
CERTIFICATE OF CORRECTION

PATENT NO. : 8,004,137 B2  Page 1 of 1
APPLICATION NO. : 11/510818
DATED : August 23, 2011
INVENTOR(S) : Philip Albert Studer It is certified that error appears in the above-identified patent and that said Letters Patent is hereby corrected as shown below:

Col. 6, line 24, Change "nay" to --may--.

Col. 10, line 10, In Claim 18, change "mean" to --means--.

Signed and Sealed this
Fourteenth Day of August, 2012

David J. Kappos
*Director of the United States Patent and Trademark Office*